(12) United States Patent
Anderson et al.

(10) Patent No.: US 11,860,594 B2
(45) Date of Patent: Jan. 2, 2024

(54) BUILDING WITH ENERGY MANAGEMENT SYSTEM

(71) Applicant: GRID EDGE LIMITED, Birmingham (GB)

(72) Inventors: Thomas Anderson, Birmingham (GB); James Scott, Birmingham (GB); Daniel Wright, Birmingham (GB)

(73) Assignee: GRID EDGE LIMITED, Birmingham (GB)

( * ) Notice: Subject to any disclaimer, the term of this patent is extended or adjusted under 35 U.S.C. 154(b) by 443 days.

(21) Appl. No.: 16/964,821

(22) PCT Filed: Jan. 23, 2019

(86) PCT No.: PCT/GB2019/050190
§ 371 (c)(1),
(2) Date: Jul. 24, 2020

(87) PCT Pub. No.: WO2019/145712
PCT Pub. Date: Aug. 1, 2019

(65) Prior Publication Data
US 2021/0063983 A1   Mar. 4, 2021

(30) Foreign Application Priority Data

Jan. 26, 2018 (GB) ..................................... 1801278
Apr. 27, 2018 (GB) ..................................... 1806879

(51) Int. Cl.
*G05B 19/042* (2006.01)
*H02J 3/00* (2006.01)
(Continued)

(52) U.S. Cl.
CPC ............. *G05B 19/042* (2013.01); *G06N 5/02* (2013.01); *G06Q 10/06315* (2013.01);
(Continued)

(58) Field of Classification Search
CPC .......... G05B 19/042; G05B 2219/2639; G06N 5/02; G06Q 10/06315; G06Q 50/06;
(Continued)

(56) References Cited

U.S. PATENT DOCUMENTS

2014/0070756 A1   3/2014 Kearns et al.
2014/0316601 A1   10/2014 Markowz et al.
(Continued)

FOREIGN PATENT DOCUMENTS

EP   1 993 183   11/2008
GB   2 361 118   10/2001
(Continued)

OTHER PUBLICATIONS

International Search Report for PCT/GB2019/050190, dated Mar. 29, 2019, 3 pages.
(Continued)

*Primary Examiner* — Mohammad Ali
*Assistant Examiner* — Saad M Kabir
(74) *Attorney, Agent, or Firm* — NIXON & VANDERHYE P.C.

(57) ABSTRACT

A building comprises a network of energy storage and energy consuming assets, which is connected to an alternating current electric supply grid having a normal frequency through an energy management system linked to a server. The energy management system measures over a period of time the energy consumption against time of the energy consuming assets and stores the measurements taken and measures over a period of time the energy stored against time in the energy storing assets and stores the measurements taken. The measurements of energy consumption and energy stored are used to derive the base net energy need in particular time periods. The net energy need in individual time periods is exported to one or more third parties.

20 Claims, 12 Drawing Sheets

(51) Int. Cl.
  *G06N 5/02*      (2023.01)
  *G06Q 10/0631*   (2023.01)
  *G06Q 50/06*     (2012.01)
  *G06Q 50/16*     (2012.01)
  *H02J 3/28*      (2006.01)
  *B60L 53/60*     (2019.01)
  *B60L 53/53*     (2019.01)
  *B60L 53/56*     (2019.01)
  *G06Q 20/38*     (2012.01)
  *G06Q 40/04*     (2012.01)

(52) U.S. Cl.
  CPC ........... *G06Q 50/06* (2013.01); *G06Q 50/163* (2013.01); *H02J 3/003* (2020.01); *H02J 3/28* (2013.01); *B60L 53/53* (2019.02); *B60L 53/56* (2019.02); *B60L 53/60* (2019.02); *G05B 2219/2639* (2013.01); *G06Q 20/389* (2013.01); *G06Q 40/04* (2013.01); *H02J 2310/12* (2020.01)

(58) Field of Classification Search
  CPC .... G06Q 50/163; G06Q 20/389; G06Q 40/04; H02J 3/003; H02J 3/28; H02J 2310/12; B60L 53/53; B60L 53/56; B60L 53/60

USPC ....................................................... 700/291
See application file for complete search history.

(56) References Cited

U.S. PATENT DOCUMENTS

| | | |
|---|---|---|
| 2015/0217657 A1 | 8/2015 | Kang et al. |
| 2016/0216007 A1 | 7/2016 | Harbin, III et al. |
| 2016/0377306 A1* | 12/2016 | Drees ...................... F24F 11/30 700/295 |

FOREIGN PATENT DOCUMENTS

| | | |
|---|---|---|
| GB | 2 426 878 | 12/2006 |
| GB | 2510735 | 8/2014 |
| GB | 2519635 | 4/2015 |
| WO | 2017/062896 | 4/2017 |

OTHER PUBLICATIONS

Written Opinion of the ISA for PCT/GB2019/050190, dated Mar. 29, 2019, 5 pages.

* cited by examiner

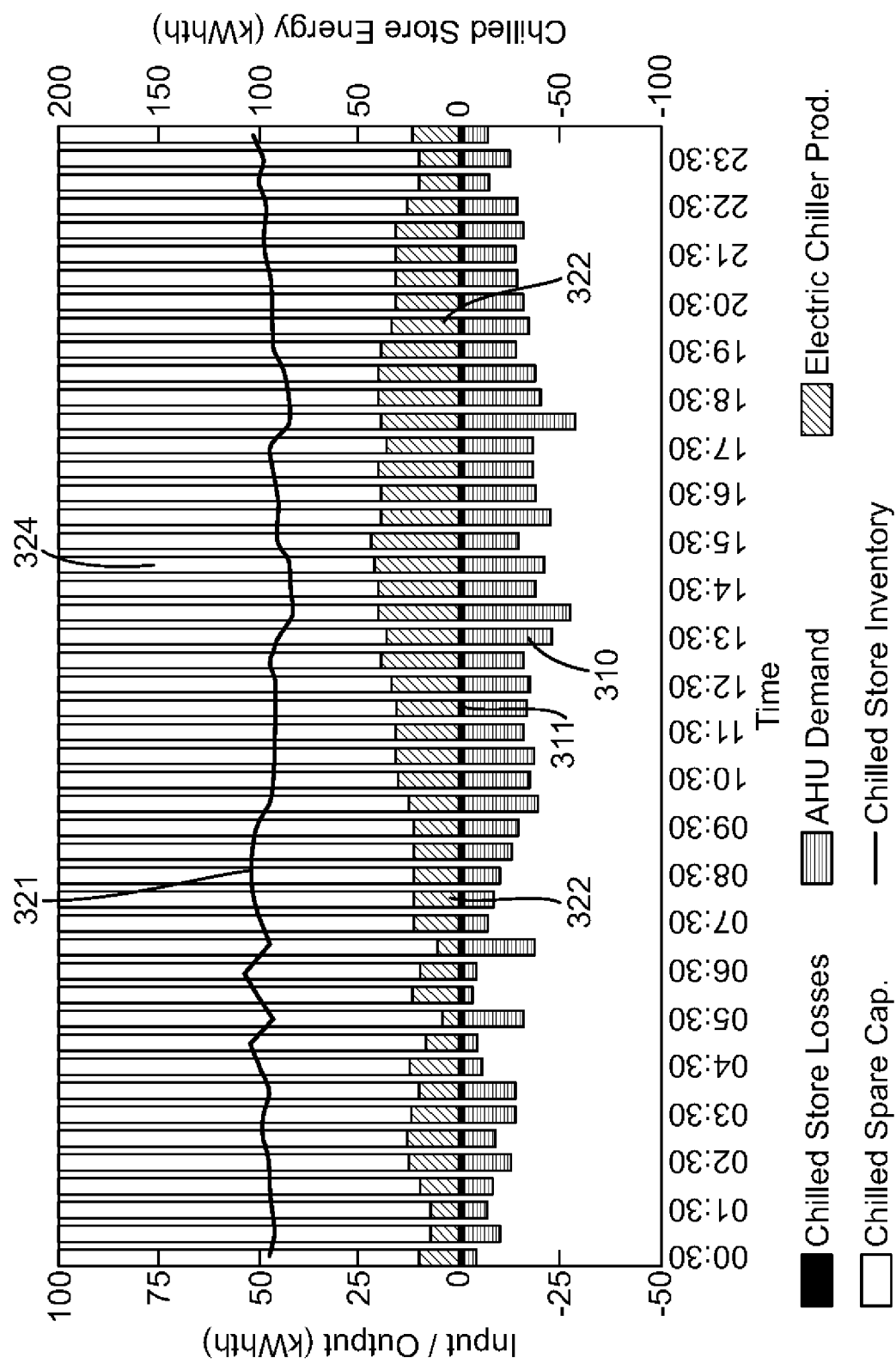

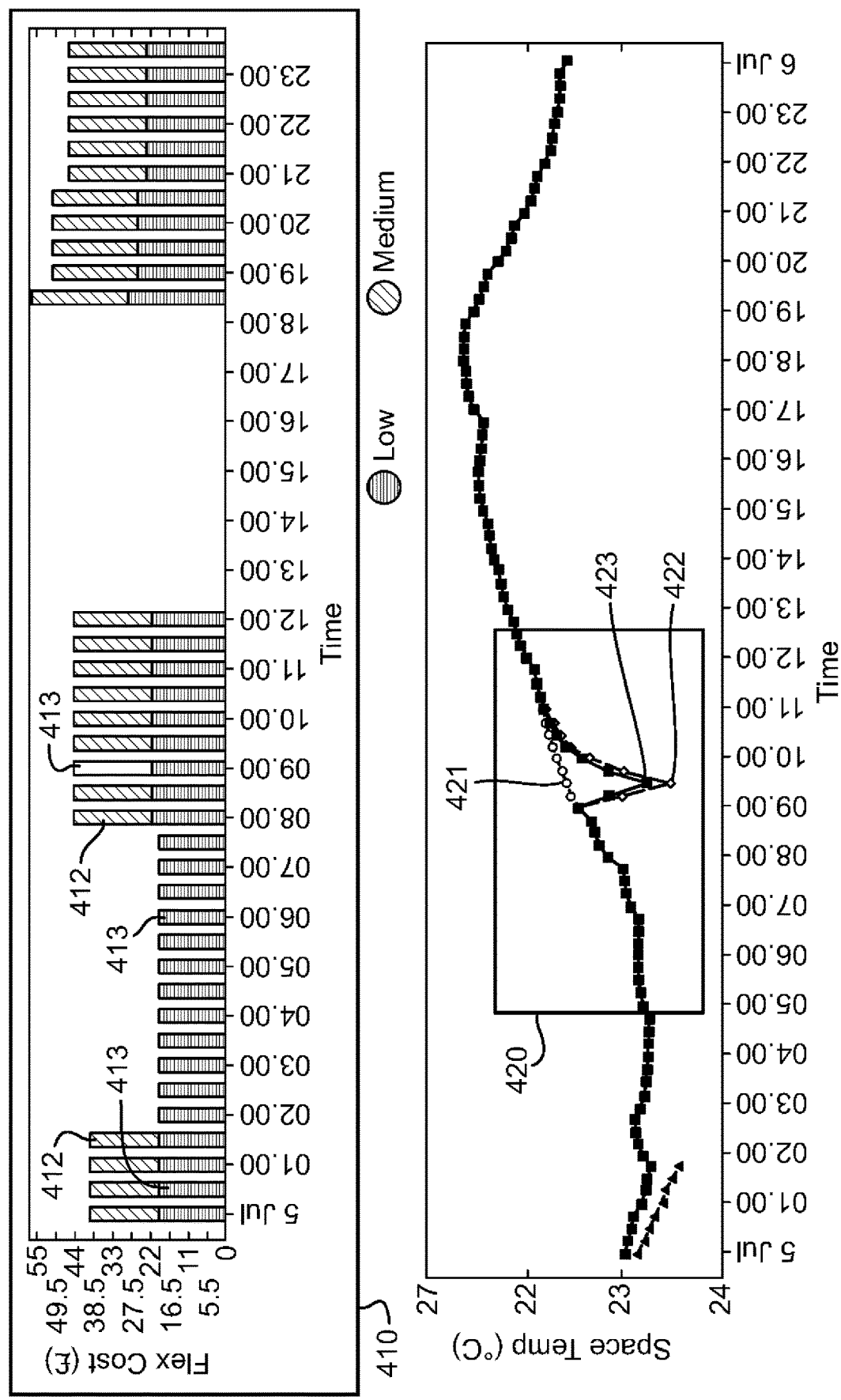

BUILDING WITH ENERGY MANAGEMENT SYSTEM

This application is the U.S. national phase of International Application No. PCT/GB2019/050190 filed 23 Jan. 2019, which designated the U.S. and claims priority to GB Patent Application No. 1801278.1 filed 26 Jan. 2018, and GB Patent Application No. 1806879.1 filed 27 Apr. 2018, the entire contents of each of which are hereby incorporated by reference.

TECHNICAL FIELD

This invention relates to a building energy management system to optimise costs for a user of energy and to assist suppliers of electric power better to regulate demand for electricity. It also provides a system whereby energy suppliers can, in part, manage loads on the grid.

BACKGROUND ART

Existing building energy management systems are generally passive in the sense that they are computer-based systems that help to manage, control and monitor building technical services (HVAC, lighting etc.) and the energy consumption of devices used by the building. They provide the information and the tools that building system managers need both to understand the energy usage of their buildings and to control and improve their buildings' energy performance. These legacy systems do not use artificial intelligence automatically to control a system rather they provide a human manager with tools and information better to control the consumption of energy.

More recently limited artificial intelligence systems, such as that of BuildingIQ®, continuously obtains data on the local weather forecast, the occupancy for the building, energy prices, tariffs and demand response signals. Based on those inputs, such systems run thousands of simulations to arrive at the most efficient operating strategy for the period ahead, normally the following 24 hours. Such systems then communicate with the building management system to make changes to the building heating, cooling and ventilation settings to optimise those settings.

None of the prior art systems takes note of issues on the energy supply side. Energy generation systems tend to produce excess energy when demand is low and insufficient energy when demand is high, as a result, of the latter expensive stand-by power generation systems have to be brought on stream at short notice to meet the extra demand Excess supply is dealt with in part through electricity generating companies providing consumers with attractive tariffs to take power at times of lesser demand or excess energy supply.

There is a requirement therefore for energy management systems which can smooth demand over a period of time and minimise the need for stand-by generation capacity.

DISCLOSURE OF INVENTION

According to the present invention a building has a network of energy storage and energy consuming assets, said network being connected to an alternating current electric supply grid having a normal frequency through an energy management system linked to a server: in which the energy management system measures over a period of time the energy consumption against time of the energy consuming assets and stores the measurements taken in the server, measures over a period of time the energy stored against time in the energy storing assets and stores the measurements taken, and uses the measurements of energy consumption and energy stored to derive the base net energy need in particular time periods, and exports the net energy need in individual time periods to one or more third parties.

The third party, provided with information concerning base and net energy needs energy needs of such a network in a particular period, has the opportunity of comparing the base energy needs of the grid with available supplies at a given price and offering to the operator of the network system an incentive to reduce the network's energy demands at times of predicted energy shortage in the grid or to increase the network's energy drawdown at times of predicted energy excess in the grid. Thus in a further aspect of tan energy consuming system according to the invention, the network is responsive to an external request to vary the energy requirement from the base energy need in response to a request from this party to whom information concerning the base energy need has been provided.

The response can be in the form of manual intervention, automatic intervention, or, more normally, semi-automatic intervention wherein the request is reviewed by a person of by a computer system using particular parameters and accepted or rejected before any implementation. Acceptance would normally be based on the financial terms offered by the third party to accept such variation. Proof of acceptance of financial terms and checking that the request was implemented would normally be in the form of "block-chain" technology.

Other features of the invention can be ascertained from the accompanying examples and claims.

BRIEF DESCRIPTION OF DRAWINGS

FIGS. 3A to 3E illustrate the use of the energy management systems controlling the cooling system of FIG. 2.

EXAMPLES OF THE INVENTION

Figure 1:
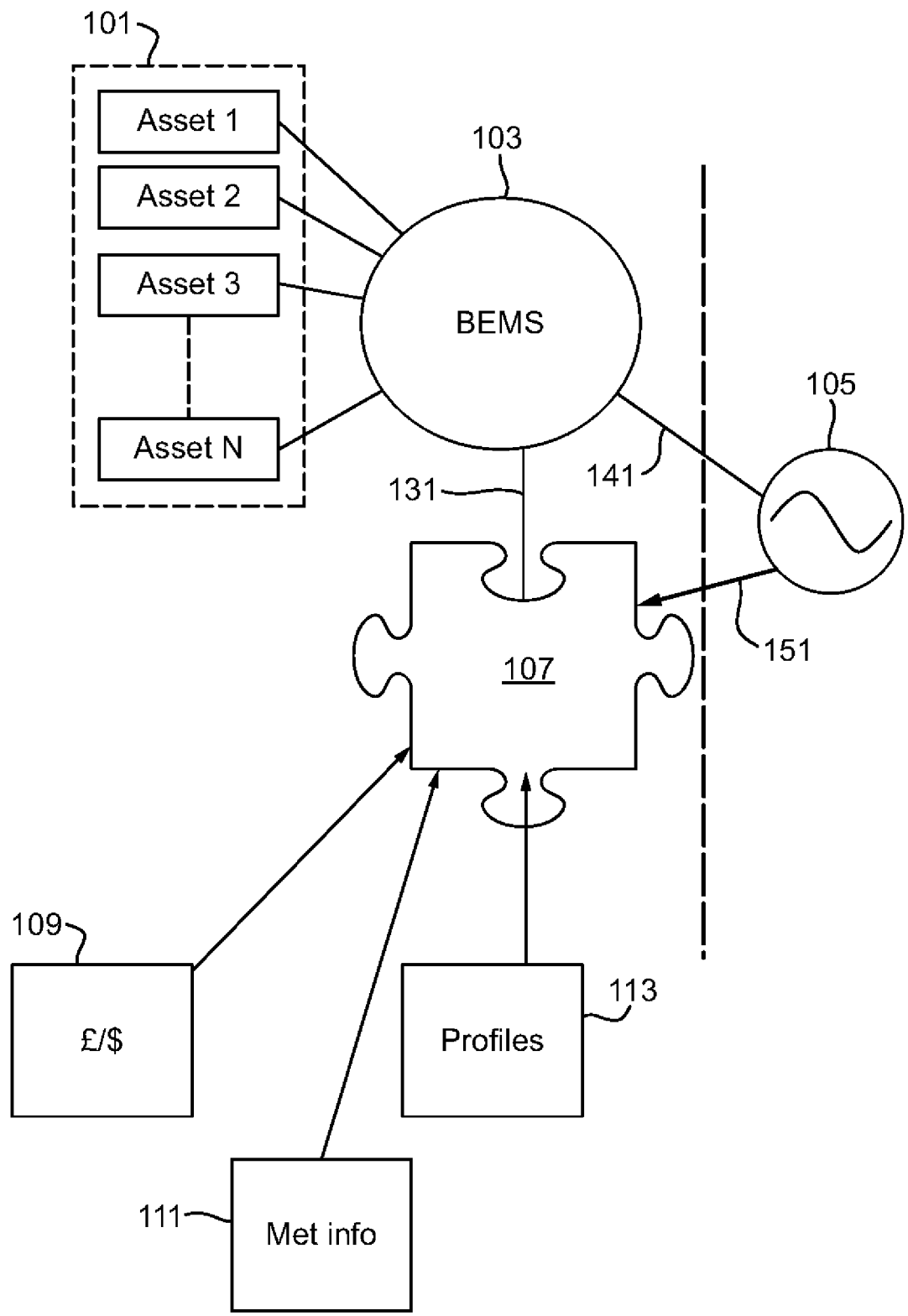
FIG. 1 is a schematic illustration of a building having a managed energy system in accordance with the present invention.

In FIG. 1, a building or group of buildings 101 contains a number of ventilation, heating and/or cooling devices Asset 1, Asset 2, Asset 3 . . . Asset N. deployed in individual rooms or areas of the building or group of buildings 101. The Assets 1, 2, 3 . . . N have the capability of storing energy either alone or collectively. The energy storage may, for example, be in in form of a heat sink, battery, fly-wheel, up-hill pumping device or other.

The ventilation, heating and/or cooling of the building or group of buildings 101 is controlled by a building energy management system 103 which switches on and off the Assets 1, 2, 3 . . . N and causes them to store energy. The Assets 1, 2, 3 . . . N draw power 141 from the grid 105, the power draw-down for each being controlled by the building energy management system 103 using Ethernet or Wi-Fi connections (the individual power connections to each asset are omitted for clarity.

A broadband connection 131 links the building energy management system 103 to a server or servers 107 which may be remote from or collocated with the building or group of buildings 101. The server provides an artificial neural network to generate predictive information over time 115 concerning energy requirements based on known consumption patterns of the Assets 1, 2, 3 . . . N obtained from those assets through the building energy management system 103. This information is stored as a profile 113 in respect of each Asset 1, 2, 3 . . . N for individual days of the week to reflect usage patterns, which may vary from one day to another. Predicted and spot energy cost information 109 is obtained from the electricity supplier and fed to the cost model for the assets. Meteorological information 111, particularly temperature and humidity predictions for the immediate future in the locality of the building or group of buildings 101, is downloaded to the server(s) 107.

The neural network on the server 107 is a regression-based predictive learning programme which continually updates the profiles 113 based on experience, in this way the profiles become "smarter" or more reflective of reality as time passes.

By combining the meteorological information 111 with the asset profiles 113, it is possible to gain a prediction on an hour by hour/minute by minute basis of the forthcoming energy needs of the assets. By combining this with the cost information 109, it is possible to predict costs and programme to Building Energy Management system to prepare an energy draw-down profile to draw power from the grid 105 when the energy costs are at their lowest and cause the Assets 1, 2, 3 . . . N to store enough excess energy for use when energy cost are high so that the Assets 1, 2, 3 . . . N do not have to draw energy from the grid 105 at times of predicted higher costs.

However, the embodiment shown in FIG. 1 goes further than this. Through the link 151, the neural network on the server 107 identifies when there is excess power in the grid 105 because the frequency of the grid increases, say, by 1% above the nominal frequency (50 Hz in the UK). At that point the server 107 switches the building energy management system to cause the Assets 1, 2, 3 . . . N to take and store energy up to a pre-set maximum. If that draw down, plus what would be drawn down following the energy profile at a particular time would take takes the asset concerned above its available capacity, preference is given to drawing down excess energy off the grid (rather than following the pre-set profile) so that the management system always guarantees to the electricity supplier the availability of capacity to absorb excess energy up to an agreed maximum. The ability to absorb excess energy up to a maximum can be agreed with the energy supplier on a time basis, so that the capacity described is only available to the grid at certain times of day or week.

Figure 2:
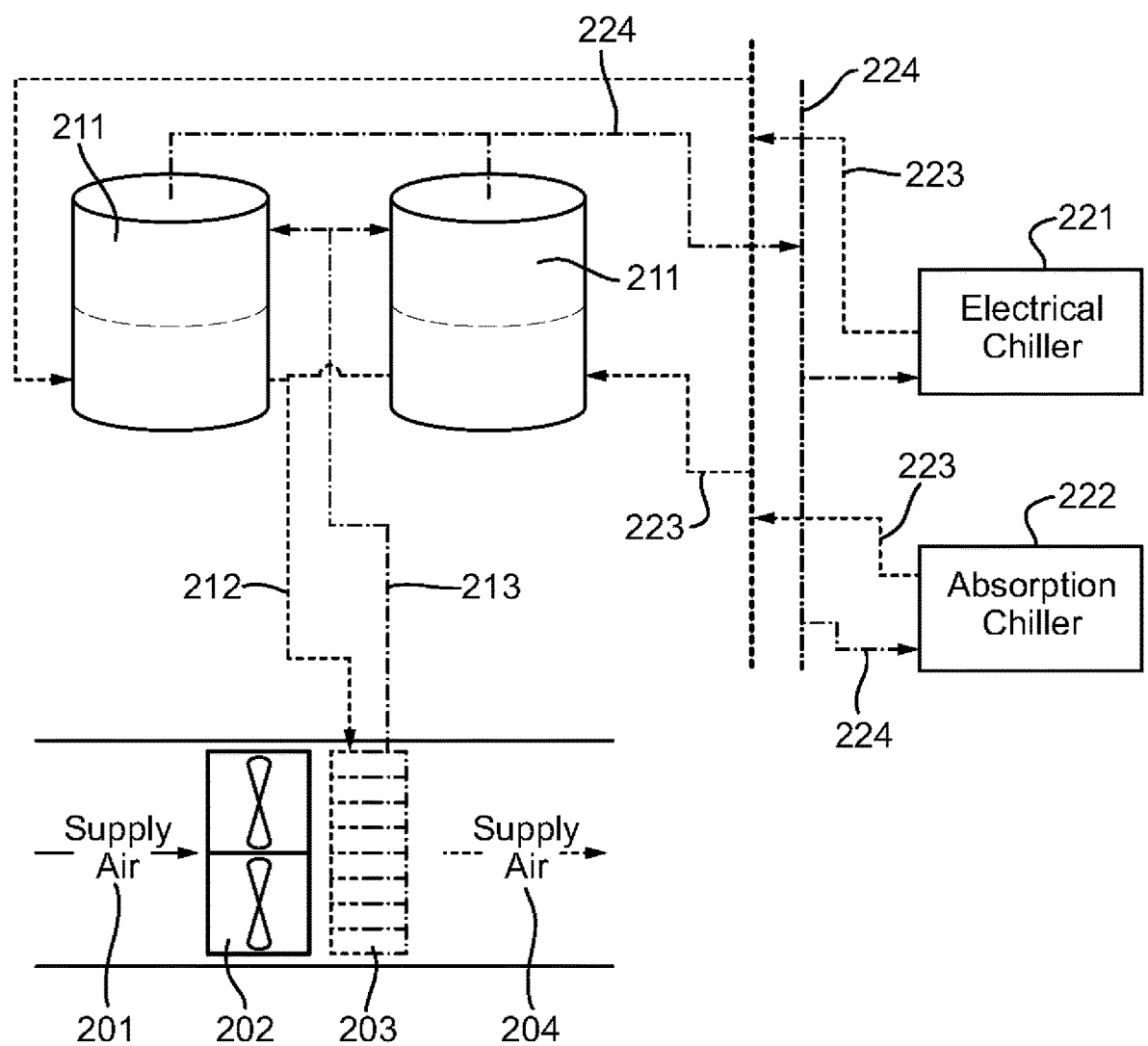
FIG. 2 is a schematic diagram of an air-cooling asset in the building of FIG. 1.

FIG. 2 show a schematic diagram of a cooling unit, which may be one of the assets, to which the system of FIG. 1 was applied.

The unit comprises a duct 201 in which fans 202 are mounted driving air from a closed space, such as a room, through a heat exchanger 203 to a chiller. Warm air from the chiller passes through the heat exchanger 203 giving up heat to a fluid passing through the heat exchanger from a cold duct 212 from the bases of fluid storage tanks 211 to a duct 213 which takes the warmed fluid to the top of the fluid storage tanks. Warmed fluid is taken from the tops of the tanks 211 through warm fluid ducts 224 to an electric chiller 221 or an absorption chiller 222. In the chillers the fluid is cooled and passed back to the bottom of the tanks 211 through cool fluid ducts 223.

In both the electric chiller 221 and the absorption chiller 222 energy is consumed in the pumping process within the chillers.

The use of the tanks 211 gives the unit considerable storage capacity for cooled fluid. Thus, by allowing the chillers 221 or 222 to cool more fluid than is needed for immediate use in the heat exchanger 203, a store of cooled fluid is built up for later use. In a sense the tanks 211 act as energy batteries in the system. By running the chillers at times of low energy cost and storing the cooled fluid for later use, considerable costs savings can be achieved over a system in which the chillers are run to meet immediate demand from the heat exchanger 203.

In simple known systems the heat exchanger 203 would be connected directly to the chillers 221 or 222, without the tanks 211. In this case the maximum demand on the chillers would occur at times of the day when external temperatures were at their highest and, probably, when similar equipment elsewhere is demanding energy resources leading to a shortage of supply in the electricity grid.

By employing the present invention, energy can be taken from the grid at times of low cost and/or excess supply, and not taken when there is a supply shortfall and/or when cost is high.

To heat, rather than to cool, the flows in lines 212, 213, 223, 224 are reversed with the chillers acting as fluid heaters.

FIGS. 3A to 3E illustrate the beneficial impact of the energy management system of the invention applied to an asset illustrated in FIG. 2.

Figure 3A:
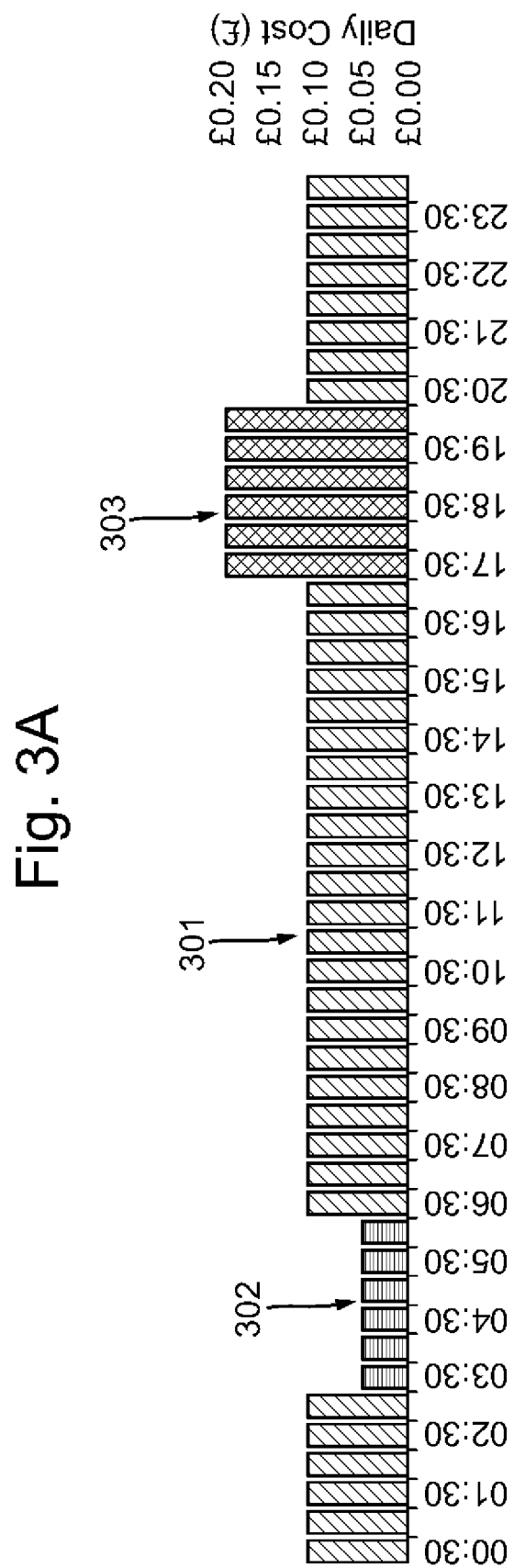

In FIG. 3A, a typical pricing structure for the supply of electricity to commercial premises is shown. Between 06 30 and 17 30 and again between 20 30 and 03 30 a standard tariff applies 301. Between 03 30 and 06 30 the price 302 is low, about half the standard tariff, reflecting low demand at that time. Between 17 30 and 20 30 the price is high 303, reflecting high demand for electric energy at that time.

FIG. 3B shows the energy demands of the asset of FIG. 2 bars 310 and the energy losses from the asset bars 311, primarily as a result of fluid storage in the tanks. The asset of FIG. 2 in this mode is operating with a conventional building energy management system which controls energy provision to the assets based on previous patterns of requirements, meteorological information, i.e. predictions of the outside temperature. Thus, the system tends to draw energy from the grid to meet short term predictions and needs. The electrical energy taken from the grid at any time is shown by bars 322, with line 321 showing the stored energy (in the case of the asset in FIG. 2); this is in the form of chilled fluid in tanks 211. By matching energy consumed with energy demanded the system maintains the energy store in the tanks at about 50% of capacity, the stored energy is represented by line 324. The system has about 50% redundancy in its energy storage capacity, but the system is also taking considerable amounts of energy from the grid at the peak period between 17 30 and 20 30.

Figure 3C:
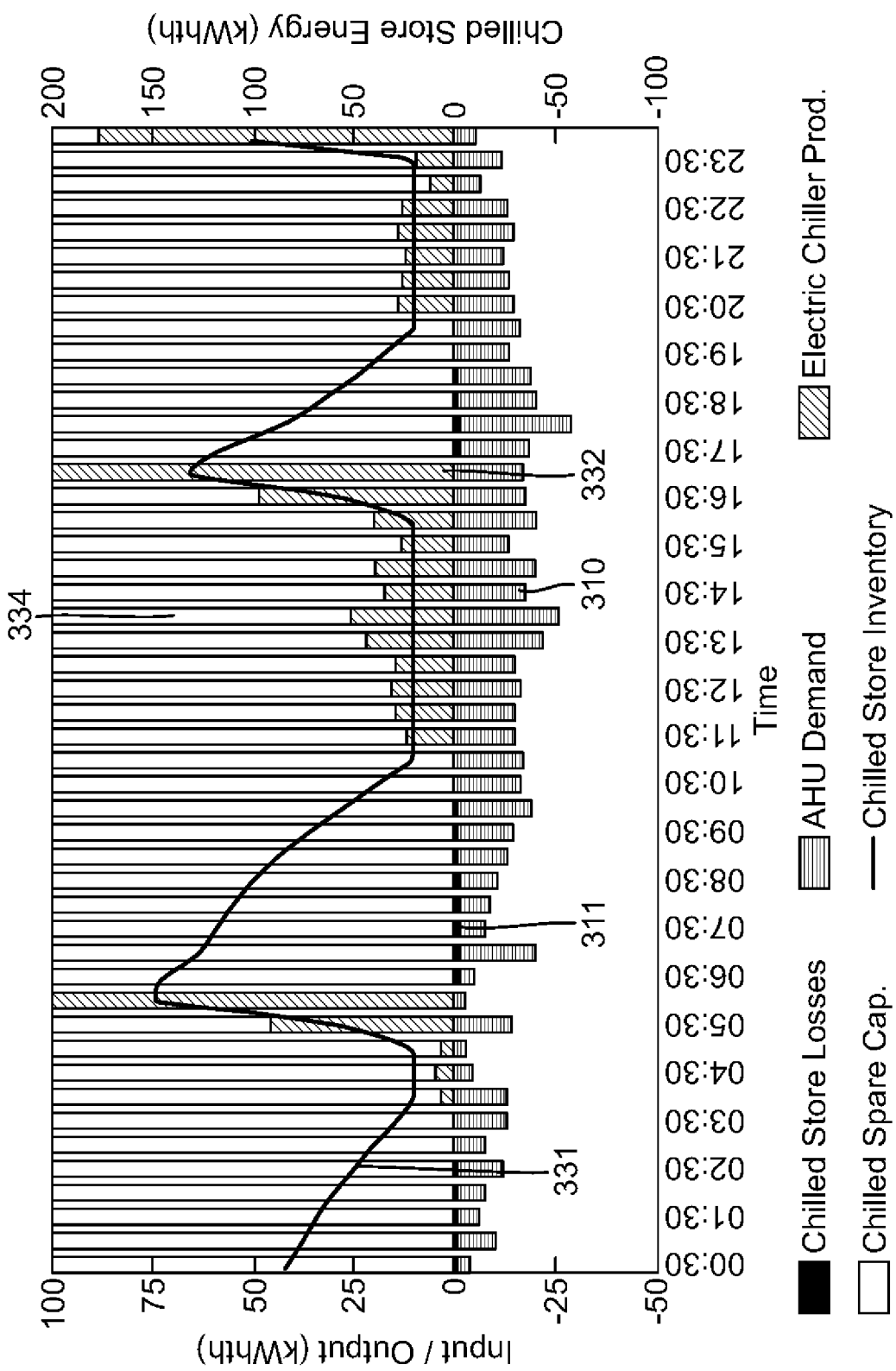

FIG. 3C shows the same system, but now using energy price information. In this model the system draws energy up to its total capacity, when the price is lowest but taking account of predicted future demands. The pattern of energy consumption 310 in this model is the same as that of the model control by an existing standard building energy management system, The asset prioritises taking energy from the grid between 03 30 and 06 30 when the tariff is lowest, storing that energy in the tanks 211 as cooled fluid and not taking further energy from the system until the sored energy has reduced to about 10% of stored energy capacity about 11 30; as the tariff at that time is the standard tariff it draws sufficient energy to maintain the store at 10% of capacity, but does not draw any excess for the time being. For the exemplified asset, a time of high demand is between 17 30 and 20 30 exactly when the electricity supply tariff is at its highest. To avoid paying the highest tariff, the system anticipates the high demand and stores enough energy to meet that demand between 16 30 and 17 30 when the standard tariff applies (the standard tariff being approximately half the peak tariff). The energy stored in the system is shown by line 331, which can be seen to be rising to a peak after energy is drawn from the grid for storage purposes when power is relatively cheaper and dropping as energy is taken from the tanks 211 and used during periods when energy is relatively more expensive. As can be seen line 331 drops to 10% of capacity when storage is simply matching demand. As the energy storage pattern has changed from that in FIG. 3B, the pattern of energy losses from the asset represented by line 311 changes. The losses are higher than those in FIG. 3B immediately after energy recharging but lower when energy storage is reduced to 10% of capacity. Overall the total losses are reduced by 44% from the previous value and running costs reduced by 17.6% compared with the conventional building energy management system of FIG. 3B.

Figure 3D:
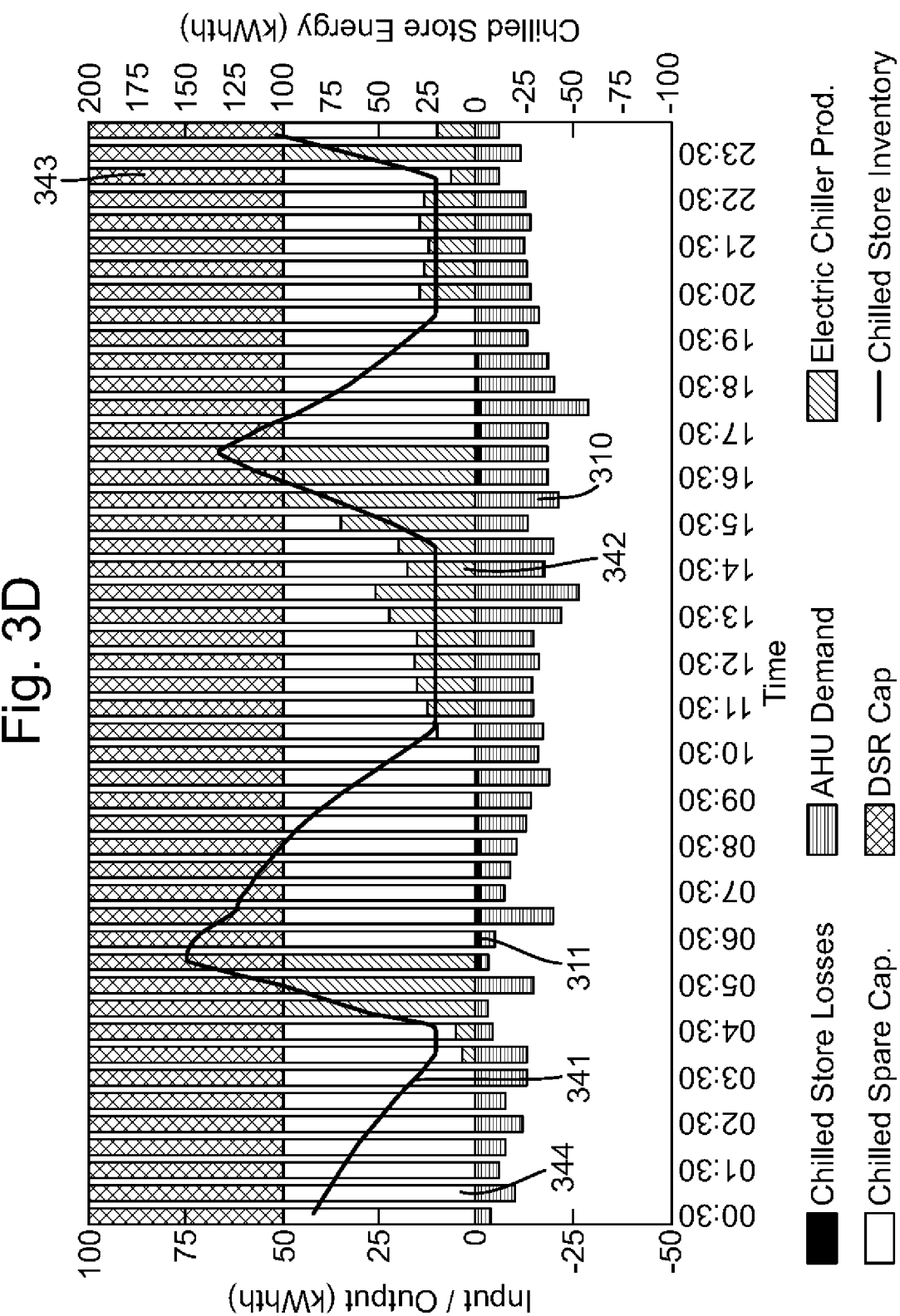

Because electricity generating companies have a requirement for take up of excess energy generated or to cut off supplies for a short time when energy demand is exceeding generation capacity, the companies have tariffs under which they will pay to have the excess energy taken. In FIG. 3D, the system is organised not to demand more than 50% of the input capacity at any one time, with the remaining 50% of capacity made available to the energy in the grid. This is controlled by monitoring the frequency of the grid as described with reference to FIG. 1 and allowing power to flow to the until and to be stored in the tanks 211 up to the available capacity for a short time. The monitoring system also identifies a shortfall of generation capacity on the grid, by a frequency reduction on the grid. The system stops the asset taking power. This latter capability will become even more important as electricity supply companies increasingly move to the spot pricing of major commercial consumers, where the price relates the actual demand at any time.

FIG. 3D illustrates the effect of use of an energy management system as described in FIG. 1 in connection with an energy consuming asset shown in FIG. 2. In FIG. 3D the energy management system limits the power take of the asset represented by bars 342 to 50% of capacity, the other 50% shown by bars 343 being available to the grid for off-load of excess power. The output of the asset at any time represented by bars 310 is unchanged, but the rate of replenishment of energy stored in tanks 211 (FIG. 2) is spread over longer periods. But as these periods are at time when energy costs are below the peak costs there is no difference from the model of FIG. 3C for the costs for total energy supplied. However, as there now is capacity for the grid to off-load excess energy up to a total capacity of 50% of the asset, there is additional payment from the energy company for this facility. Furthermore, the asset has resilience to withstand withdrawal of supplies for short periods when demands on the grid are high, and this can be done when the frequency in the grid is detected to have dropped below a present level, say 1% below the nominal frequency (50 Hz in the UK).

In FIG. 3D the losses in the system are shown by bars 311, these are a bit higher than the model in FIG. 3C, but still significantly below the model of FIG. 3B however the cost savings to a consumer over the standard building energy model of FIG. 3B.

Table 1 below illustrated the impact of the models of FIGS. 3B, 3C and 3D.

TABLE 1

| Input/Output Capacity100 Kwh | Conventional Prior Art Building Management FIG. 3B | Price Sensitive building energy management - FIG. 3C | Building energy management according to the invention |
|---|---|---|---|
| Power usage KwH | 504.01 | 488.34 | 492.18 |
| Losses KwH | 70.65 | 39.30 | 47.0 |
| Reduction in losses | | 44% | 33% |
| Cost/day in £ | 61.20 | 50.41 | 19.58 |
| Savings over Convention prior art building management (£) | | 10.79 (17.6%) | 41.62 (68.0%) |

The achieved using the system of FIG. 1 (present invention) are, therefore, considerable.

Figure 3E:
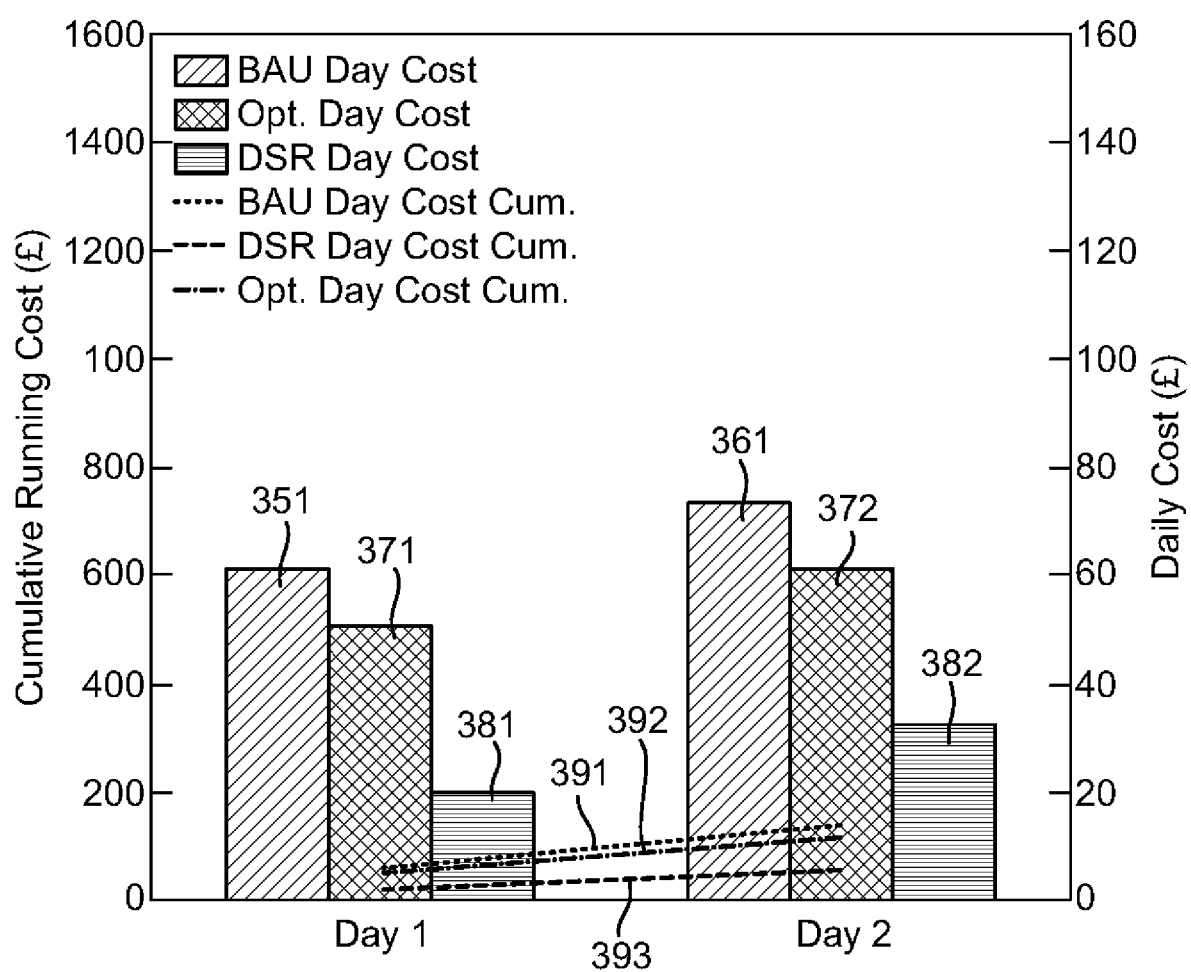

FIG. 3E shows the costs on two separate successive summer days. Day 1 is the day one which the examples 3B 3C and 3D were drawn up. Day 2 is the following day which was warmer. As a result of the warmer weather, more energy was consumed on day two, but the relative costs savings from the prior art building management system bars 351 (Day 1) and 361 (Day 2) show the costs using conventional building management controls, Bars 371 and 372 show the costs on Day 1 and Day 2 managing according to energy costs, and Bars 381 and 382 show the costs on Day 1 and Day 2 using a building energy management system in accordance with the invention. Line 391 shows the cumulating costs over Days 1 and 2 using a conventional building management system, line 392 the same but using a building management system controlling based on costs and line 393 the cumulating costs overs Days 1 and 2 using a building management system according to the present invention.

Although the building asset described by way of an example is a space cooling and warming system, the principles can be applied to any heating, cooling or heating asset in a building, and indeed machinery and other powered devices provided they have an energy store associated with them. Although the energy store described is a fluid tank, other energy stores such as batteries and flywheels can be used. The main criterion for such stores is that they have sufficient capacity to store and supply energy to the asset concerned during periods in which power may be interrupted.

Although in the foregoing example, the level of demand in the grid is identified by measuring the frequency of supply, it can also be identified by measuring the voltage of supply, a higher than pre-set voltage indicating low demand on the grid, and a lower than pre-set voltage excess demand.

The system described in the foregoing example can also be used to provide third parties, for example energy traders, power distribution companies and energy aggregation companies information about the predicted demand from a consumer using such a system, the flexibility within his system for reducing or increasing power consumption in a given period and the ability of the third parties to seek adjustments of the consumption in the given period.

For example, in the UK and elsewhere energy is a traded commodity. Supply companies buy energy on long term and shorter-term contacts for supplies in half hourly slots covering each day. Prices of these contracts vary according to the predicted demand in the half hourly slots. At pre-set time (normally 30 minutes in the UK) before the beginning of a slot trading ceases and the National Grid has rapid resources which it can make available to the energy supply companies to make up for any shortfall in between their contracted supplies and their actual demand. However, the supply companies have no control over the price of such short-term supplies, which can be very high, nor do they have visibility of the costs of such supplies for some time after the event. To avoid the need to purchase such supplies, the system of the present invention gives the energy traders in the supply companies information concerning the degree to which the consumers using the system can be flexible in their demands and to seek a reduction by the consumer of demand when the supply has fallen short in contracted energy supplies for a particular period. Likewise, if in a particular period the energy supplier has contracted for more energy than is the predicted demand, the system enables identification of consumers who can absorb more power in the period concerned. The flexibility provided by the method of the invention enables shortfalls in contracted supplies to be reduces or eliminated without recourse to high cost stand-by supply, or excess contracted supply to be absorbed. The consumer would be offered a price for reducing or increasing demand in a period in which contracted supply is predicted to be below or above actual requirement; the price, of course would be below the price the trader would have to pay to secure extra supplies on the market, or the loss incurred in having excess supplies.

As another example, presently in the UK, power distribution companies (so called Distribution Network Operators) try to install enough distribution capacity to meet all demands. This is expensive. Additionally, with consumers installing micro-generation capacities such as solar power, and increasingly battery storage and, in the future, vehicle recharging facilities, predicting and installing the required distribution capacity is becoming increasingly difficulty, the sources of supply and demand become opaquer. Furthermore, supplies based on solar or wind power can vary enormously depending on weather. Rather than installing capacity to cope with every conceivable situation, the Distribution Network Operators would find the system of the present invention very advantageous for by knowing the predicted demand of a consumer and that consumer's ability to vary his demand, the Distribution Network Operator can plan on the basis that excess demand can be reduced. The consumer would be offered a price for reducing demand in a period in which the Distribution Network Operator has excess demand.

In this latter case the voltage in the Distribution Network Operators system would be measured by the Distribution Network Operator or a third party service provider to the Distribution Network Operator who would request the energy consuming and storage system to reduce demand, the system or its manager would then respond. The response can be by manual over-riding the system or automatic.

Energy aggregators operate similarly, by identifying the possibility of reducing or increasing demand, energy aggregators can smooth their supplies across several inputs. A similar consumer price incentive structure can be envisaged.

This leads to a stacking system in which bids from more than one energy company, distribution company and aggregation company is made to reduce or increase demand. A stacking system would automatically identify, using the bid information and the other operating parameters of the system, when a bid is advantageous to the consumer. In the case of competing bids or changes in projected consumption at a particular time, which is most price advantageous or whether the bids are complementary.

Figure 4:
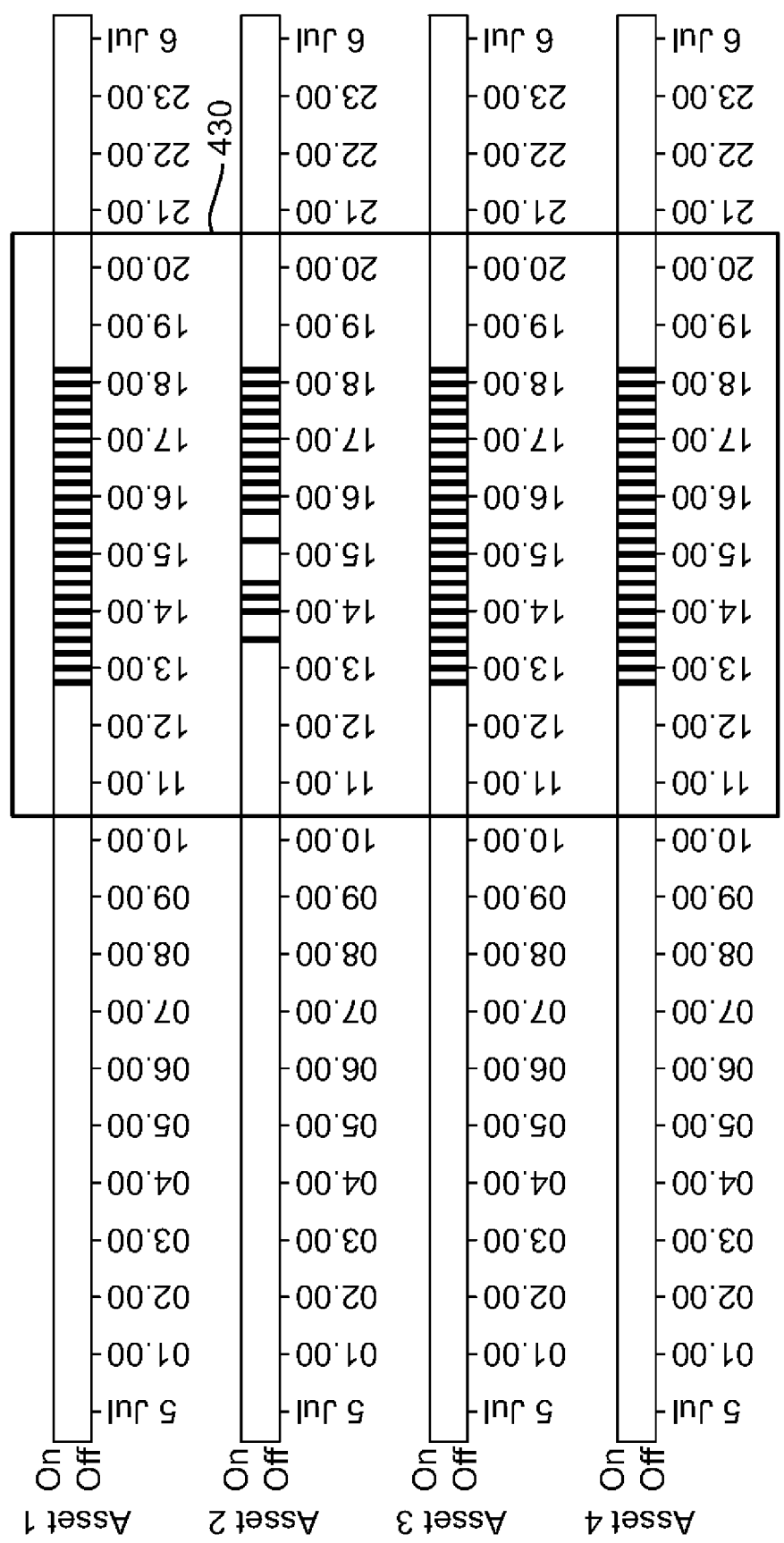
FIG. 4 shows intervention in an energy consuming system based on use by a third party of information exported from the building energy management system.

FIG. 4 illustrates one possible implementation. The energy consuming and storage system makes available to energy suppliers and distributors its available flexibility in 30-minute periods in terms of kWh available on a 24 hours day ahead basis 401. It can also provide to the operator of the energy consuming and storage system a predictive curve showing the impact on, for example space temperature, caused by a reduction in the energy drawn from the grid 402. In the example shown the predicted energy demand are shown as bars 411 and 412, the lower bar 411 indicating a required energy demand and the upper bar 412 predicted demand that the user of the system is prepared to sacrifice as a trade with an energy company of distributer to reduce demand. As a result of the predicted demand the projected temperature in a building maintained by system is shown by line 421. If energy or distribution company wishes the operator to forgo the flexible demand element in a half hour slot shown by bar 413, the system will predict the revised projected temperature in the building, line 422. In practice line 423 shows what occurred in this example, which was a little better than projected. By reviewing the prediction of building temperature, the system user can decide whether to permit a reduction of energy taken to the extent of the bar 413 or not. If as shown in this example the building operator has set a minimum air temperature in the building of 24° C., the predicted temperature even with the reduced energy supply remains above that temperature, and the operator would be prepared, for a price, to accept reduced energy input to the extent of the height of bar 413, but not reducing the inflexible energy needs indicated by bar 411.

It is also possible for the system to project periods, in 30-minute slots, where assets in the system could absorb energy, this is indicated by the bars 430. If the energy generator or distributor wanted excess energy in the system to be absorbed the bars 430 indicate which assets in the energy consuming and storage system have the capacity absorb and store excess supply, and this can be made available to the energy generator or distributor.

As a final tool, the complexities of running the kind of contracts necessary securely to implement the payment arrangements for such system operating across multiple sites and involving multiple suppliers, distribution companies and aggregators probably requires the use of block-chain technology. Block chain technology can securely establish that a request of change in the demand was made, that the change was made, the payment due as a result of the changed demand and making the payment. The actual monitoring and billing system to be used is outside the scope of the present invention.

In a further use of the invention, in times of power shortages, in the grip energy can be exported from the building to the grid, from the stored energy in the storage systems in the building. The relevant Distributed Network Operator can determine their headroom to receive energy from building employing the invention within a headroom set by the relevant Distributed Network Operator. The building management system can then respond to the request to supply energy to the grid at a price offered by the Distributed Network Operator.

In a further development of the invention the building is on a site in which electric vehicle charging points are installed, and any vehicles at the charging points comprise energy storage assets. This is illustrated in FIG. 5.

Figure 5:
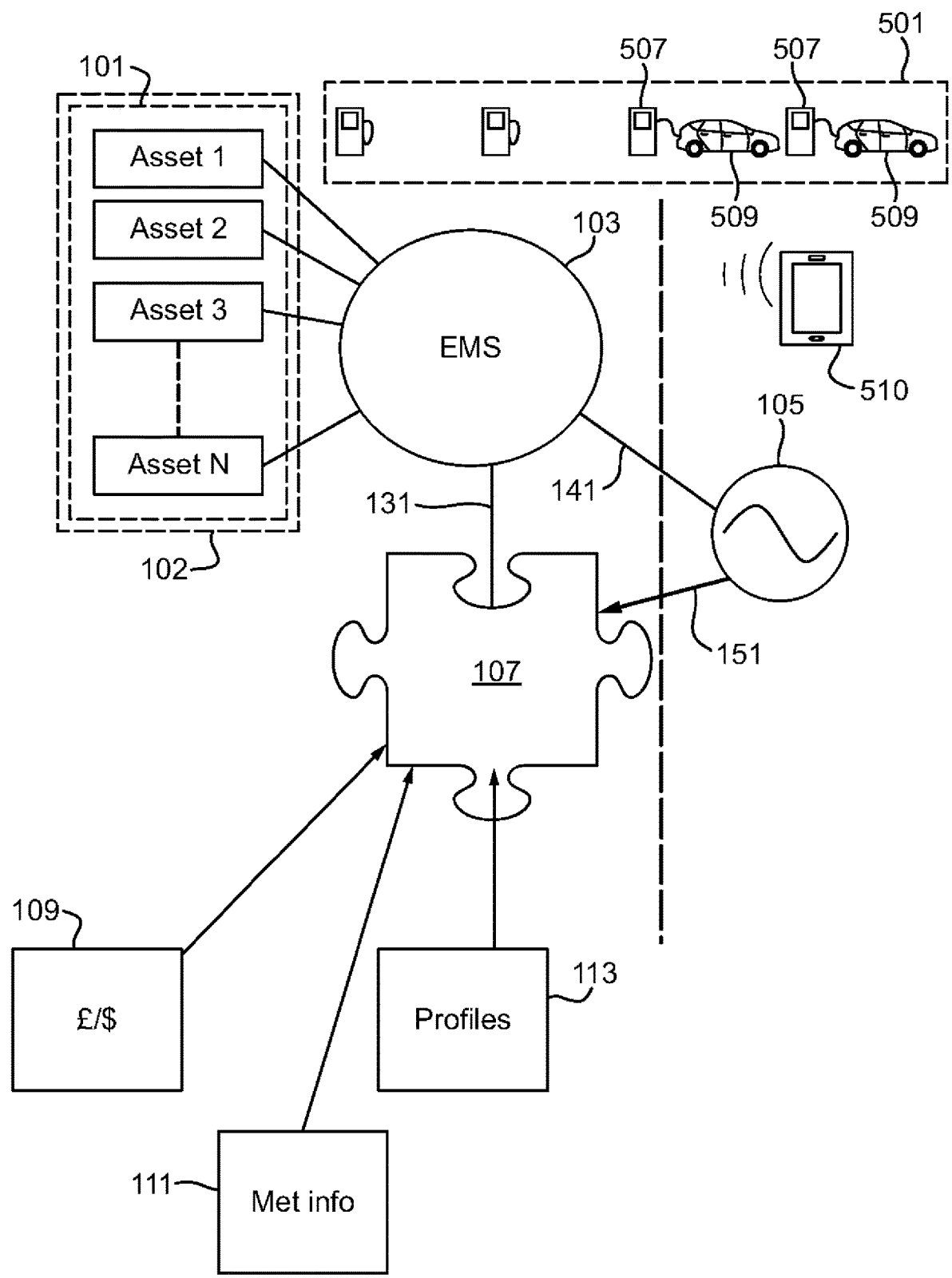
FIG. 5 illustrates the building of FIG. 1 with an electric vehicle charging network installed in proximity.

In FIG. 5, a network of electric vehicle charging points 501 is installed on a site adjacent to or linked to a building 101 already having a network 102 of energy storage and energy consuming assets Asset 2, 3, 4 . . . N, and connected to an alternating current electric supply grid 105 through an energy management system 103 controlled by a distributed network operator (DNO) through an energy management system 103 to a local electricity supply connection 141 is illustrated in FIG. 5 as a step-down transformer. The network of electric vehicle charging points 501 comprises electric vehicles charging points 507, some of which are shown charging connected to electric cars 509.

The local supply connection 141 will normally have limited capacity to supply both the building and vehicle charging network 501 before becoming overloaded, with a risk that the connection would become overloaded and fail. One option would be to install a higher capacity connection. But that remedy, applied widely, would be extremely expensive and disruptive; it may also need an increase in over-all generating capacity in the grid to deal with peak loads.

In this instance, the need for providing additional capacity is largely avoided by managing the combined load on the building energy network 102 and electric vehicle charging point network 501. Furthermore, the vehicles 509 provide further energy storage and consumption assets which can be used in connection with the building network assets in managing energy.

The building 101 could be a shopping complex, warehouse, airport terminal building or a railway station being examples of situations in which significant electric vehicle charge facilities may be provided in the vicinity of the building 101.

In a further development, the energy management system 103 is linked to a vehicle parking booking system 510, of the kind that is common for pre-booking parking spaces for airport and hotels. Use of such a system would enable the energy management system 103 to be aware of forthcoming demands of the vehicle charging network 501 and prioritize energy requirements in the building 101 and vehicle charging network 501 according to predicted demands.

The electric vehicle charging network 501 and network 102 of building Assets 2, 3 . . . N draw power 141 from the grid 105; the power draw-down for each is controlled by the energy management system 103 using Ethernet or Wi-Fi connections (the individual power connections to each asset are omitted for clarity).

A broadband connection 131 links the energy management system 5 to a server or servers 107 which may be remote from or collocated with the site. The server provides an artificial neural network to generate predictive information over time 115 about energy requirements based on known consumption (or predicted) patterns energy requirements of the electric vehicle charging network 501 and Assets 2, 3 . . . N obtained from those assets through the energy management system 103. This information is stored as a profile 113 in respect of the electric vehicle charging network 501 and each other Asset 2, 3 . . . N for individual days of the week to reflect usage patterns, which may vary from one day to another. Predicted and spot energy cost information 109 is obtained from the electricity supplier and fed to the cost model for the assets. Meteorological information 111, particularly temperature and humidity predictions for the immediate future in the locality of the building or group of buildings 101 and the electric vehicle charging facility 501, is downloaded to the server(s) 107, noting that weather can impact significantly upon vehicle usage and demand on the charging network 501.

By combining the meteorological information 111 with the asset profiles 113, and any information from a vehicle booking system concerning vehicle bookings system 510, it is possible to gain a prediction on an hour by hour/minute by minute basis of the forthcoming energy needs of the vehicle charging network 501 and the other assets. By combining this with the cost information 109, it is possible to predict costs and programme to Building Energy Management system to prepare an energy draw-down profile to draw power from the grid 105 when the energy costs are at their lowest and cause the electric vehicle charging network 501 and Assets 2, 3 . . . N to store enough excess energy for use when energy cost are high so that the vehicle charging network and Assets 2, 3 . . . N do not have to draw energy from the grid 105 at times of predicted higher costs or when requirements are predicted to outstrip the capacity of the local supply 141.

Energy can be taken from the grid at times of low cost and/or excess supply, and not taken when there is a supply shortfall and/or when cost is high. Energy can be taken from energy stores in the building to supply the high priority charging points in electric vehicle charging network and to heat or cool the building 101 as necessary.

The predicted demand information from the vehicle charging network 501 is combined with that from the building energy network 102 and exported to an energy supply company who can use the information to approach the site management to vary their predicted demands control system to meet an anticipated short-fall or excess power in the grid 105. Payment arrangements can be agreed between the power supplier and the site management which would represent a saving to the electricity supply company compared to the price that the company might have to pay on the spot market to cover for the short-fall.

Although the arrangements of FIG. 5 invention are described with reference to vehicle parking adjacent to or linked with buildings, such as shopping centres, airport terminals, railway stations and warehouses, it can easily be applied to any electric vehicle charging facility, for example charging facilities for electric vehicles such are fork lift trucks, and transport vehicles used within buildings. Examples of these include vehicles used for picking and moving goods within warehouses, electric transport buggies used in airports and other public areas to transport less mobile passengers, luggage transporters used in airports and railway stations. In such controlled systems, instituting priority supply can be used easily.

A vehicle charging system as illustrated in FIG. 5 can be used in conjunction with an arrangements in which a Distributed Network Operator set headroom to receive energy as described in previously, so the system exports energy up to a pre-set headroom determined by the Distributed Network Operator, at times when there is a shortfall on the grid.

In another development of the invention predictions of comfort levels within a building are used as part of the predicted energy demand profile.

Figure 6:
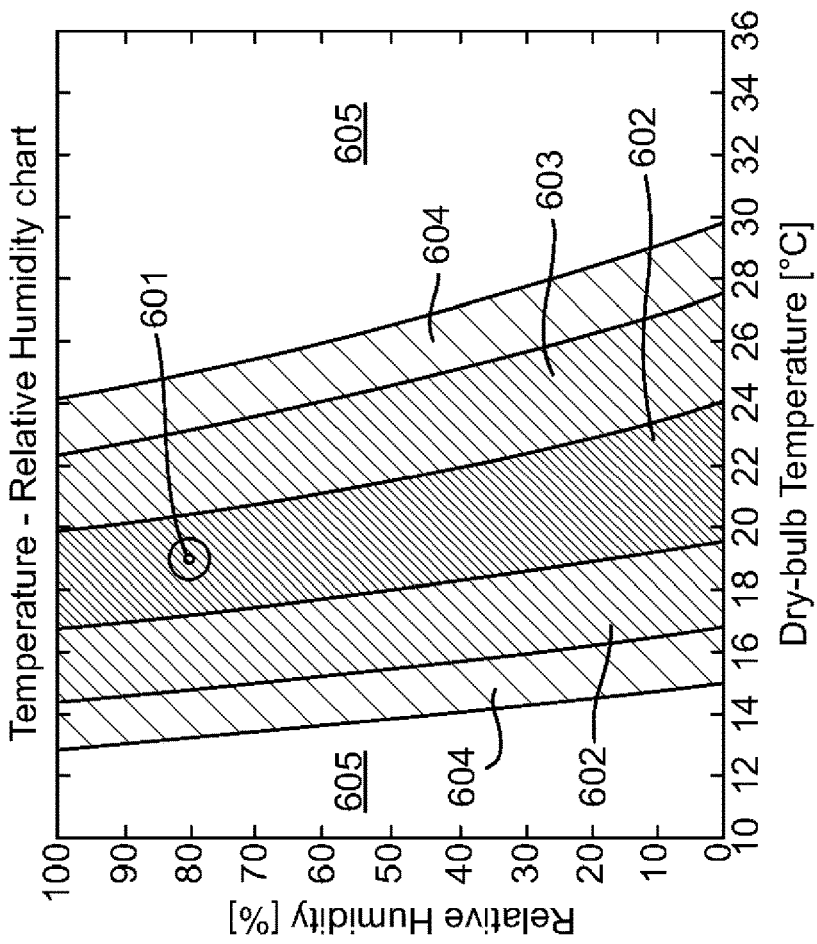
FIG. 6 illustrates the use of comfort measures to predict energy consumption in a building of FIG. 1.

FIG. 6 shows a Center for the Built Environment (CBRE) Thermal Comfort tool (found at www.comfort.cbe.berkely.edu), illustrating, how, for various inputs a measure of comfort can be derived. In the illustrated chart, the parameters shown—air temperature, radiant temperature, air speed, humidity, with people walking in a building at relatively low speed, places the degree of comfort 601 in an ideal band shown by the band 602, changing the parameters will move the position 601 into slightly less comfortable bands 603, or less comfortable bands 604, or to very uncomfortable bands 605. For example, if the air temperature is increased or decreased by 1.5° C. and nothing else changes the comfort band moves into band 604, alternatively if the air speed is increased comfort decreases. Projected clothing and activity can have a dramatic effect, a seated person needs a far high air temperature in which to be comfortable than and a person walking and clothed in clothing normally worn outside a building.

Figure 7:
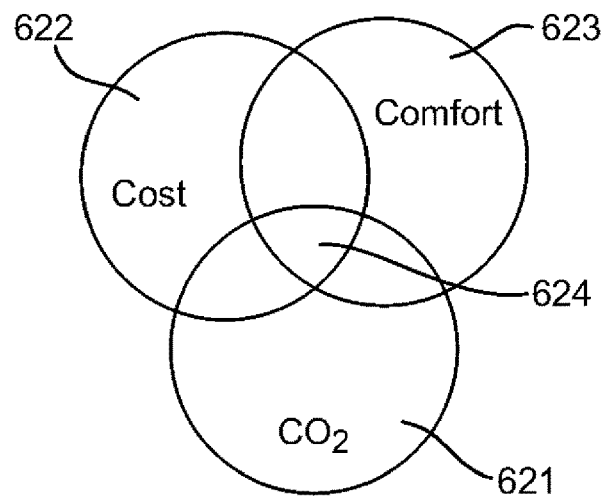
FIG. 7 shows a Venn diagram illustrating selection of preferred operating parameters for the energy management system shown in FIG. 1.

FIG. 7 shows a Venn diagram illustrating conflicting demands on a building control system, circle 621 represents the target carbon footprint of the building, circle 622 the target cost of the energy use of the building, and circle 623 the target comfort zone of the building, and circle 623 the target comfort zone: if targets have been properly set, there should normally be an area 624 where all three targets can be met, and the energy management system 103 would be set normally to control the building energy needs to be within that target zone 624.

Figure 8:
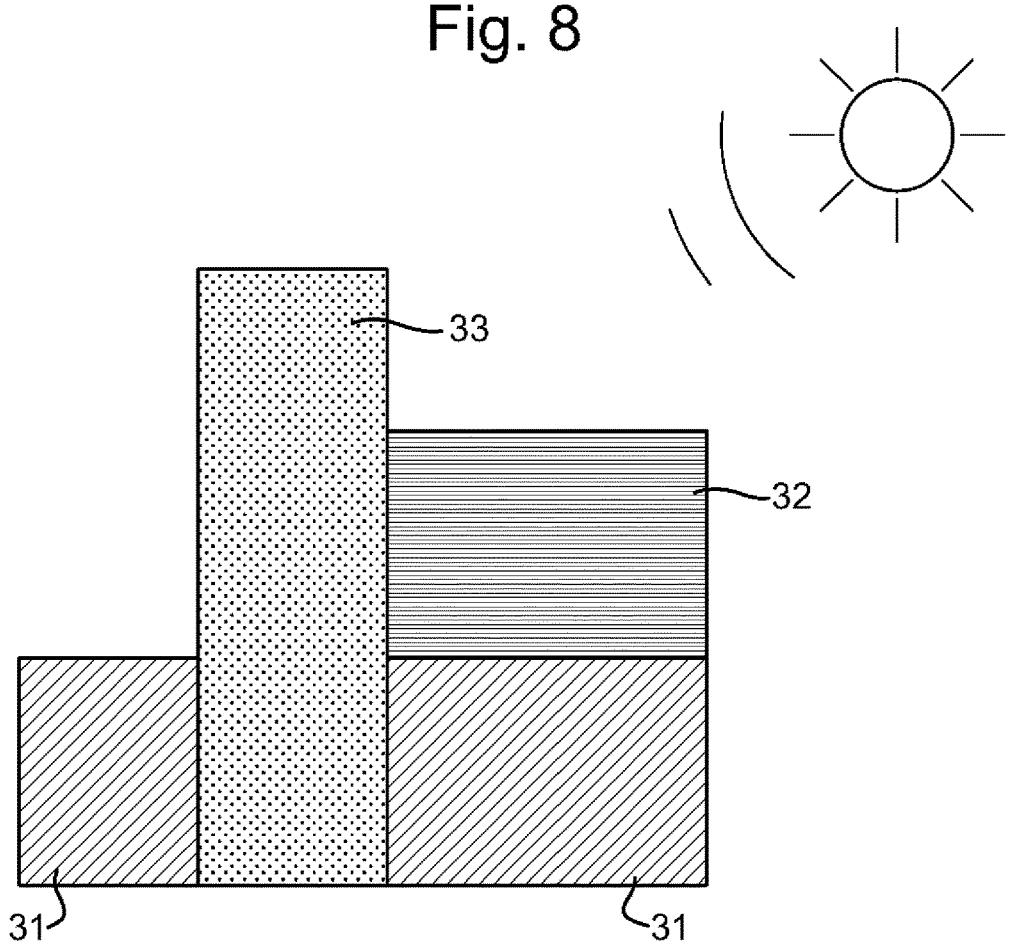
FIG. 8 is a schematic drawing of a building showing the impact of orientation and external surfaces upon comfort in different areas of a building.

It will also follow from the analysis of FIG. 6, different parts of a building can have different control parameters needed to ensure comfort, depending on the number of people present in an area, and the activity taking place in that area, and clothing likely to be worn in the area. Further, exposure of some parts of a building, for example, to radiated heat from the sun, will impact on the energy needs of that part of the building, In the illustration in FIG. 8 the blocks 631, 632 and 633 show different parts of a building. It is assumed that the sun is to the right of and above the building. Block 631 has the lowest exposure to radiated heat as it has no roof on the sunny side of the building, (its roof is in the shadow of block 632), bock 631 will therefore naturally be the coolest part of the building. Black 632, has a side and roof exposed to radiated heat and with become the hottest part of the building, block 633 as a smaller exposure and will probably be somewhere between the extremes. It is also clear that the number of people, their activity and clothing will also impact on the comfort levels in the three blocks and thus the energy needs of the three blocks.

Using the derived information concerning comfort, temperatures and air circulation within the blocks 631, 632 and 633 can be adjusted to give the best comfort to most people in those blocks. Comfort measures too, can also give the energy management system 103 information to enable, say temperature adjustments in blocks of building to reduce energy consumption, by reducing temperature in a block of a building but remaining within areas of the diagram of FIG. 6, which are still the good comfort or perhaps slightly less comfortable areas. Giving the building manager more flexibility to control energy costs.

The invention claimed is:

1. An energy management system for managing a building having a network of energy storage assets and energy consuming assets, said network being connected to an alternating current electric supply grid having a normal frequency through the energy management system linked to a server, in which the energy management system is configured to:

measure over a period of time the energy consumption against time of the energy consuming assets and store the measurements taken, measure over a period of time the energy stored against time in the energy storage assets and store the measurements taken, and use the measurements of energy consumption and energy stored to derive a forecasted base net energy need in individual time periods, and export the forecasted base net energy need in the individual time periods to one or more third parties, wherein the energy consumed by the network of energy storage and energy consuming assets varies according to requests made by the one or more third parties, whereby the energy management system is configured to, for each individual time period, maintain the forecasted base net energy need at or below a maximum level of power consumption for the respective individual time period set by the one or more third parties in response to the forecasted base net energy need.

2. The energy management system of claim 1 in which the energy stored in the network varies according to requests made by one or more third parties.

3. The energy management system of claim 1 in which the impact of varying the energy demands upon the building is evaluated and such evaluation is used to accept or reject such a request by a third party.

4. The energy management system of claim 1 in which the overall benefit to the system of requests or offers made by multiple third parties is evaluated by the energy management system according to either predetermined or dynamic criteria and in which the requests are implemented in order of preference.

5. The energy management system of claim 1 in which each asset of the energy storage assets and energy consuming assets is configured to both store energy and to consume energy, and a parameter of the electric supply grid indicative of the overall demand upon energy in the electric supply is monitored, the energy management system adjusting the energy taken from the electric supply grid and causing it to be stored in the energy storage and consuming assets when there is more energy in the electric supply that can be consumed and reducing the energy taken from the electric supply by the energy storage and consuming assets at times of high demand for energy from the electric supply grid.

6. The energy management system of claim 5 in which the parameter is frequency of the electric supply, the energy management unit reducing the energy taken when the frequency decreases by 1% or more below the normal frequency of the electricity supply and increasing energy taken by the energy consuming assets when the frequency of electricity supply is 1% or more above the normal frequency of the electricity supply.

7. The energy management system of claim 5 in which the parameter is the voltage of the electric supply, increasing the energy taken from the electric supply when the voltage exceeds a pre-set maximum and reducing energy taken from the supply when the voltage of the supply falls below a pre-set minimum.

8. The energy management system of claim 5 in which the energy storage and consuming assets are limited to receive a pre-set maximum of their storage capacity though normal demands, the remaining capacity being available to the grid to off-load excess power when frequency or voltage of the electric supply exceeds a pre-set maximum.

9. The energy management system of claim 8 in which the pre-set maximum is 50% of the storage capacity of the energy storage assets.

10. The energy management system of claim 1, which exports energy to a Distributed Network Operator within a limit determined by the Distributed Network Operator.

11. The energy management system of claim 1 on or linked to a site including vehicle charging points in which the energy storage assets include batteries or other energy storage means in vehicles at the charging points.

12. The energy management system of claim 1 in which a measure of predicted comfort of building occupants in time periods is derived in predicting energy requirements of energy consuming assets and storage capacity of energy storage assets.

13. An energy management system for managing a building having a network of energy storage assets and energy consuming assets, said network being connected to an alternating current electric supply grid having a normal frequency through the energy management system linked to a server, in which:
  a. the energy management system is configured to:
    measure over a period of time the energy consumption against time of the energy consuming assets and store the measurements taken;
    measure over a period of time the energy stored against time in the energy storing assets and store the measurements taken;
    use the measurements of energy consumption and energy stored to derive a forecasted base net energy need in individual time periods; and
    export the forecasted net energy need in the individual time periods to one or more third parties; and
  b. the energy consumed or stored in the network varies according to requests made by the one or more third parties, whereby the energy management system is configured to, for each individual time period, maintain the forecasted base energy need at or below a maximum level of power consumption for the respective individual time period set by the one or more third parties, and in which the impact of varying the energy demands upon the building is evaluated and such evaluation is used to accept or reject such a request by a third party.

14. The energy management system of claim 13 in which the overall benefit to the system of requests or offers made by multiple third parties is evaluated by the energy management system according to either predetermined or dynamic criteria and in which the requests are implemented in order of preference.

15. The energy management system of claim 14 in which the energy storage assets are limited to receive a pre-set maximum of their storage capacity though normal demands, the remaining capacity being available to the grid to off-load excess power when frequency or voltage of the electric supply exceeds a pre-set maximum.

16. The energy management system of claim 13 which exports energy to a Distributed Network Operator within headroom determined by the Distributed Network Operator.

17. The energy management system of claim 13 on or linked to a site including vehicle charging points in which the energy storage assets include batteries or other energy storage means in vehicles at the charging points.

18. The energy management system of claim 13 in which a measure of predicted comfort of building occupants in time periods is derived in predicting energy requirements of energy consuming assets and storage capacity of energy storage assets.

19. An energy management system for managing a building having a network of energy storage assets and energy consuming assets, said network being connected to an alternating current electric supply grid having a normal frequency through the energy management system linked to a server, in which
  a. The energy management system is configured to:
    measure over a period of time the energy consumption against time of the energy consuming assets and store the measurements taken;
    measure over a period of time the energy stored against time in the energy storing assets and store the measurements taken;
    use the measurements of energy consumption and energy stored to derive a forecasted base net energy need in individual time periods; and
    export the forecasted base net energy need in the individual time periods to one or more third parties; and
  b. the energy consumed or stored in the network varies according to requests made by the one or more third parties, whereby the energy management system is configured to, for each individual time period, maintain the forecasted base energy need at or below a maximum level of power consumption for the respective individual time period set by the one or more third parties, and in which the impact of varying the energy demands upon the building is evaluated and such evaluation is used to accept or reject such a request by a third party; the overall benefit to the system of requests or offers made by multiple third parties is evaluated by the energy management system according to either predetermined or dynamic criteria;
  c. the said requests are implemented in order of preference;
  d. the energy storage assets are limited to receive a pre-set maximum of their storage capacity though normal demands, the remaining capacity being available to the electric supply grid to off-load excess power when frequency or voltage of the electric supply exceeds a pre-set maximum;
  energy is exported to a Distributed Network Operator within a limit determined by the Distributed Network Operator.

20. The energy management system of claim 19 on or linked to a site including vehicle charging points in which the energy storage assets include batteries or other energy storage means in vehicles at the charging points.

* * * * *